Feb. 15, 1966 W. V. JOHNSON ETAL 3,235,197

MOTOR DRIVEN TAPE SCANNER AND REWINDER

Filed June 6, 1961 5 Sheets-Sheet 1

*INVENTORS*
WILLIAM V. JOHNSON
GEORGE A. TOMPKINS JR.
*BY* Michael J. Gonsella
ATTORNEY

MOTOR DRIVEN TAPE SCANNER AND REWINDER

Filed June 6, 1961 5 Sheets-Sheet 2

INVENTORS
WILLIAM V. JOHNSON
GEORGE A. TOMPKINS JR.
BY Michael J. Borella
ATTORNEY INVENTORS
WILLIAM V. JOHNSON
GEORGE A. TOMPKINS JR.
BY Michael S. Borella
ATTORNEY

MOTOR DRIVEN TAPE SCANNER AND REWINDER

Filed June 6, 1961 5 Sheets-Sheet 4

INVENTORS
WILLIAM V. JOHNSON
GEORGE A. TOMPKINS JR.
BY Michael J. Bonella
ATTORNEY

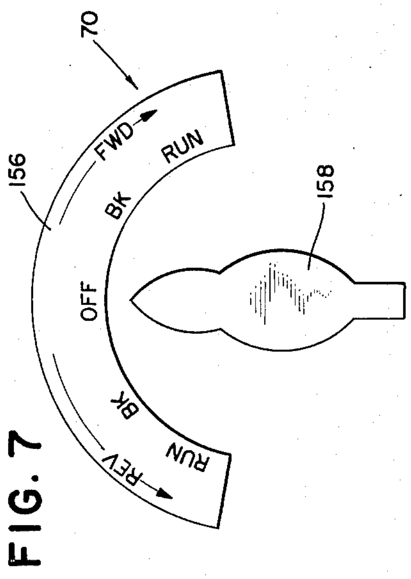

FIG. 7

FIG. 8

| | LOWER SWITCH | L.H. CLUTCH | R.H. CLUTCH | MOTOR | TAPE MOTION | L.H. MECH. BRAKE | R.H. MECH. BRAKE | LEFT HAND RELAY | RIGHT HAND RELAY |
|---|---|---|---|---|---|---|---|---|---|
| 1 | OFF | OFF | OFF | OFF | NONE | OFF | OFF | Not Operated | Not Operated |
| 2 | BRAKE | ON | ON | Dynamically Braked | NONE | OFF | OFF | Operated | Operated |
| 3 | RUN | OFF | ON | ON | → | ON | OFF | Not Operated | Operated |
| 4 | RUN | ON | OFF | ON | ← | OFF | ON | Operated | Not Operated |
| 5 | BRAKE | ON | ON | Dynamically Braked | NONE | OFF | OFF | Operated | Operated |

*INVENTORS*
WILLIAM V. JOHNSON
GEORGE A. TOMPKINS JR.
*BY* Michael J. [signature]
*ATTORNEY*

3,235,197

MOTOR DRIVEN TAPE SCANNER AND REWINDER

William V. Johnson, West Orange, and George A. Tompkins, Jr., Hoboken, N.J., assignors to The Western Union Telegraph Company, New York, N.Y., a corporation of New York Filed June 6, 1961, Ser. No. 115,199
7 Claims. (Cl. 242—67.4)

The present invention relates generally to tape rewinding apparatus and more particularly to means for searching thorugh a roll of tape to locate a specific message thereon.

In certain industrial installations many thousand messages are transmitted daily, and in many instances the same message is forwarded to a plurality of receivers. In some cases a message is lost, misplaced, or distorted, so that it becomes necessary to locate and inspect the original on the transmission tape. This invention is particularly futile in such situations where it is required to search for and locate a specific message from amongst many on a roll of tape, in order to repeat, clarify, cancel or otherwise review the same. In the usual practice, the message is at some unkown segment of the tape which has been wound on a tape reel. All messages are usually numbered, indexed, and otherwise categorized as are the tapes on which they repose. It is further policy to avoid breaking the tapes in the searching process, since these are generally stored and archived.

Heretofore the searching has been a manual operation. The tape according to number and indexation was put on a manual rewinder such as a hand cranked movie rewinder. Thereafter the searcher undertook the slow and laborious process of unwinding the tape by hand cranking. If the message sought for was disposed at the very end of the tape it was necessary to unwind the entire roll by hand.

The present invention contemplates overcoming the foregoing disadvantages by the provision of a motor driven device operable in either direction whereby a roll of tape is unwound from its reel past a scanning aid onto a second reel at relatively high and selectively regulated speed. Means are incorporated in the device to ensure smooth and orderly transfer of the tape and positive, reliable braking means integral with the device halt the tape instantly for examination without any undue stress thereon nor any danger of breaking the tape when the desired message is located.

It is therefore one of the objects of the present invention to provide a motor driven device wherein the foregoing disadvantages are eliminated, and to do so in a positive and effective manner.

Another object of the invention is to provide a device of the above indicated nature which shall be small and compact and highly adaptable for desk use.

A more specific object of the invention is to provide a tape rewinder operable in either direction at relatively high speeds that may be stopped instantly without breaking the tape.

A further object of the invention is to provide novel tape rewinding means of the above indicated nature which shall be simple and economical to manufacture, and yet positive and reliable in operation.

The foregoing and other objects and advantages will appear more fully hereinafter from a consideration of the detailed descrpition which follows, taken together with the accompanying drawings wherein one embodiment of the invention is illustrated by way of example. It is to be expressly understood however that the drawings are for the purpose of illustration only and are not to be construed as defining the limits of the invention, reference being had for this purpose to the appended claims.

In the drawings wherein like reference characters indicate like parts:

FIG. 7 is a front view of the control switch for the rewinder showing five positions of operation;

FIG. 8 is a view in tabular form showing the relationship of the components of the rewinder for the various operating positions shown in FIG. 7.

Figure 1:
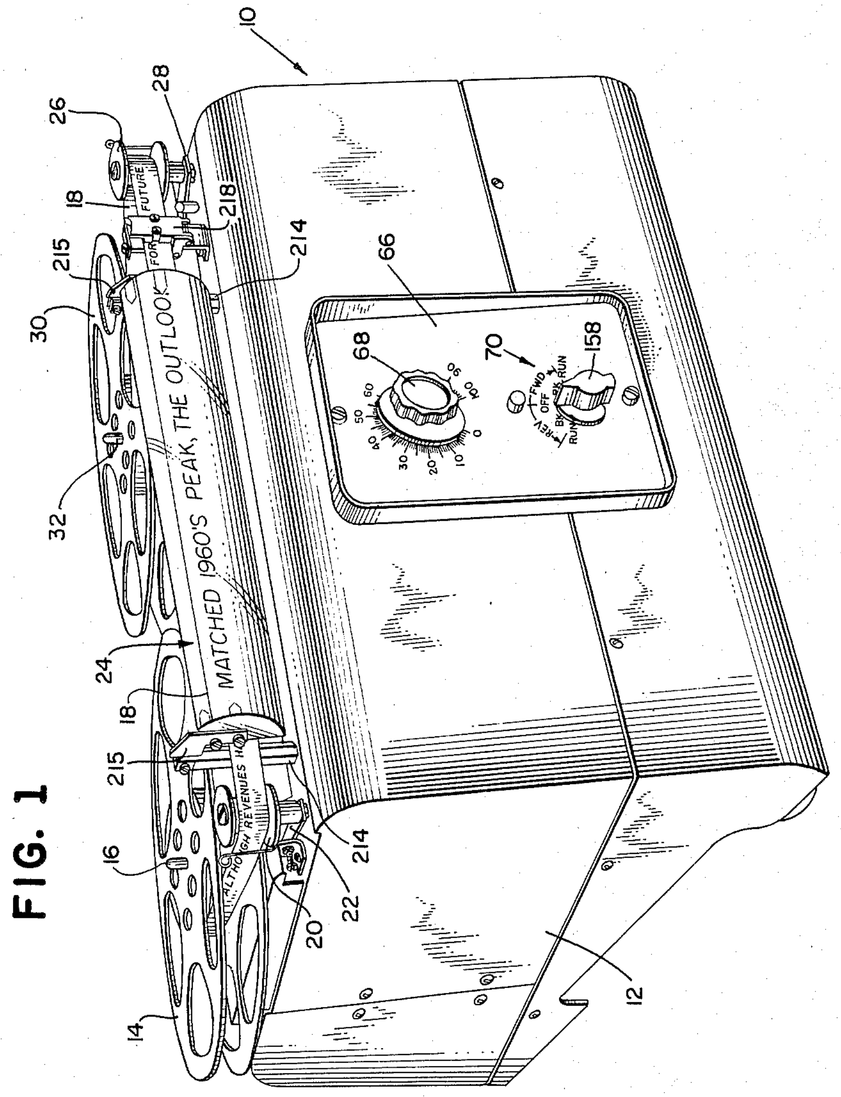
FIG. 1 is a perspective view of the tape rewinder.
Figure 2:
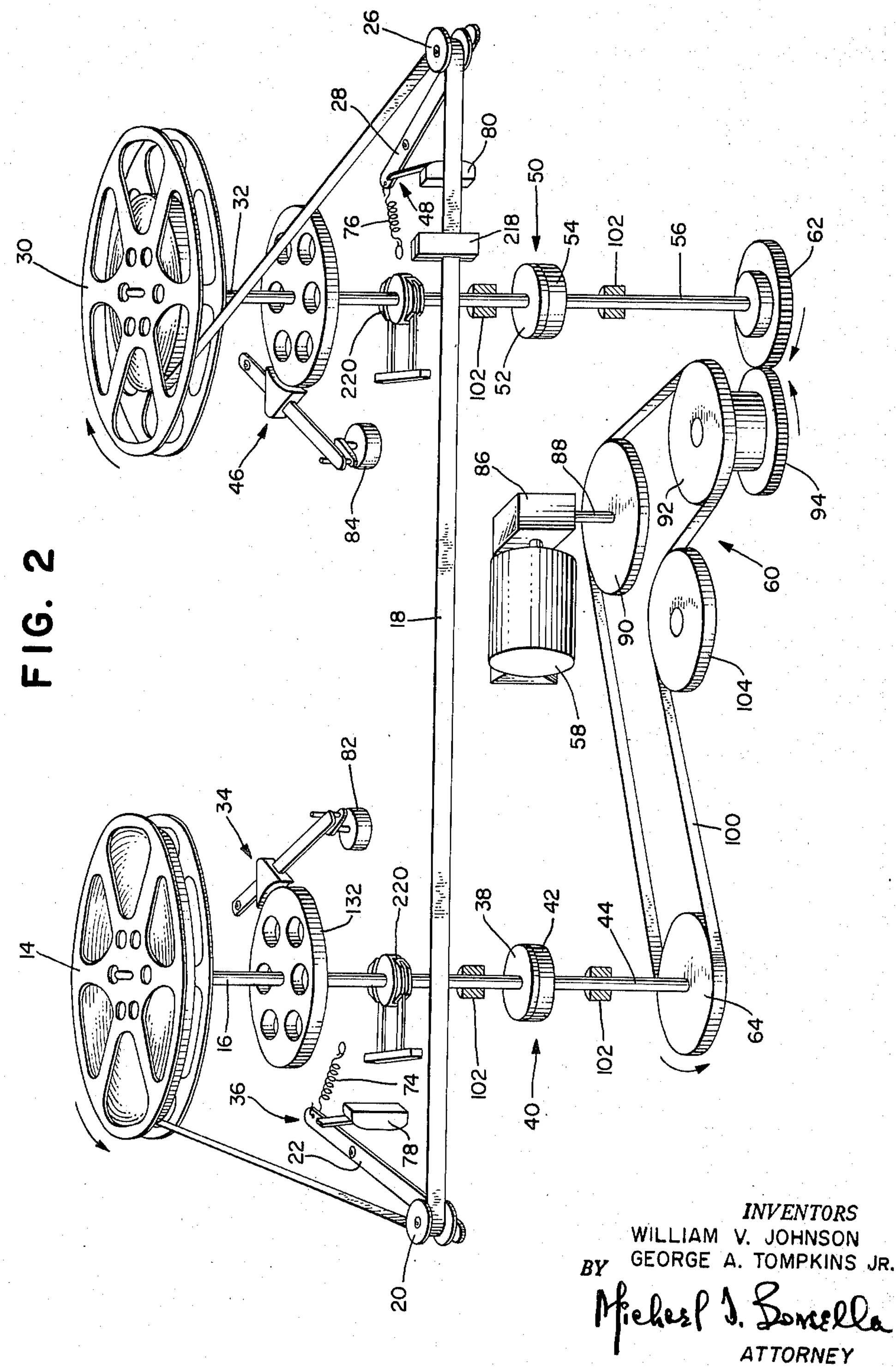
FIG. 2 is a schematic diagram of the rewinder mechanism embodying the novel subject matter of the present invention.

Referring now to the drawings and more particularly to FIG. 1, there is shown a tape rewinder generally designated by the numeral 10 and comprising an outer casing 12 containing generally the associated components shown in FIG. 2. A driven tape reel 14 mounted on a reel shaft 16 carries a tape 18 such as may conceal the desired message. The tape 18 is wound about a tape guide 20 fixed on one end of a tape tension arm 22 and thence is passed beneath a scanning device 24 prior to being wound about a guide 26 also fixed to one end of a second tension arm 28 and onto a receiving tape reel 30, mounted on a driven shaft 32. For convenience of description, the tape reel 14 together with the actuating, braking and controlling components and the like associated therewith, shall sometimes be referred to in connotation with the left hand, while the corresponding components associated with the tape reel 30 shall from time to time be referred to in connotation with the right hand.

Referring now to FIG. 2, the left hand reel 14 and shaft 16 have associated therewith a mechanical braking mechanism 34 (FIG. 4) which operates in cooperation with a tension arm assembly 36. The driven shaft 16 is secured to the driven section 38 of a magnetic clutch 40, while the driving section 42 of the magnetic clutch 40 is connected to a driving shaft 44, co-linear with the shaft 16.

The right hand reel 30 and driven shaft 32 have approximately identical components associated therewith in the form of a mechanical braking mechanism 46, a tension arm assembly 48 (FIG. 3), and a magnetic clutch 50 comprising a driven section 52 connected to the driven shaft 32, and a driving section 54 connected to the driving shaft 56.

The tape 18 and the reels 14 and 30 mounted on their respective shafts 16 and 32 together with the associated clutch sections 38 and 52 may generally be said to comprise the driven system of the rewinder 10.

A variable speed reversible drive motor 58 provides the motive power for a driving mechanism generally designated as 60 (FIG. 2) which is connected both to a driven gear 62 and driven pulley 64 so that the driving shafts 44 and 56 are synchronously driven in opposite directions.

A control box 66 (FIG. 1), comprised of a speed regulator 68 and a five position switch 70, regulates the circuitry for the device and provides the desired selection such that depending on whether the left hand magnetic clutch 40 or the right hand magnetic clutch 50 have been selected for engagement, the tape 18 may be unwound from the left hand reel 14 onto the right hand reel 30, or reversibly wound from the reel 30 onto the reel 14, at any speed desired within the operating range of the rewinder.

Figure 5:
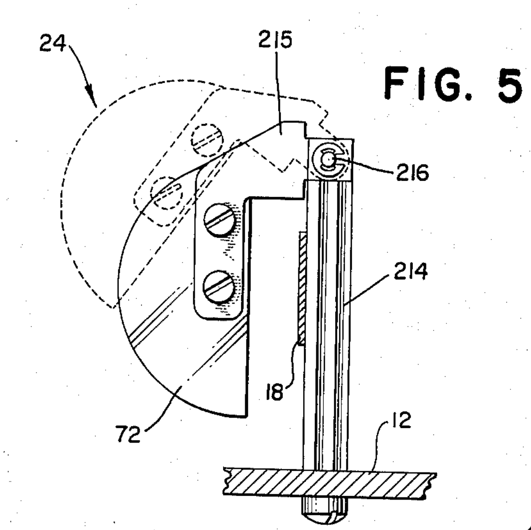
FIG. 5 is an end view of tape scanning mechanism associated with the rewinder.
Figure 6:
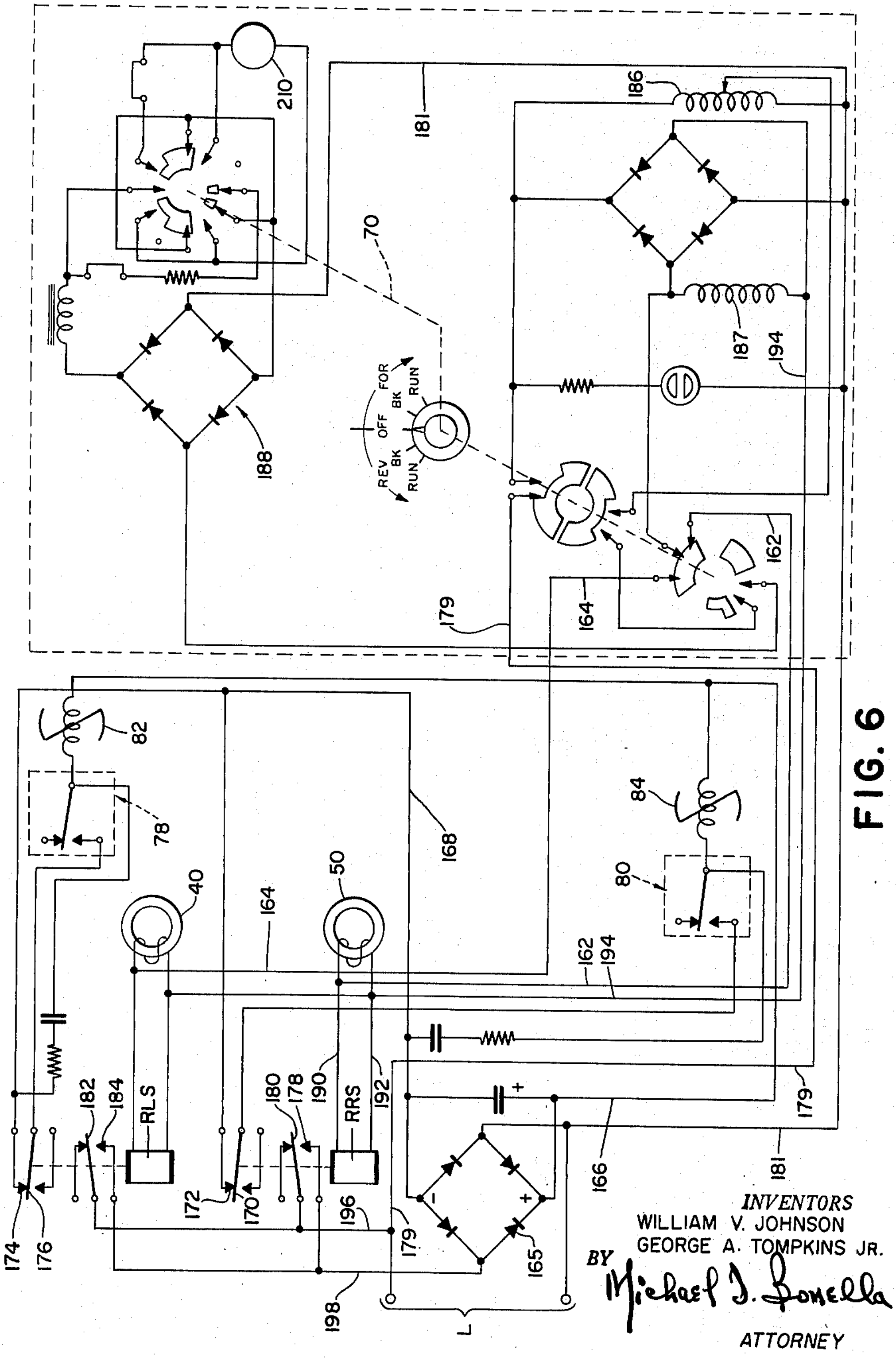
FIG. 6 is a schematic wiring diagram of the tape rewinder showing the circuitry of the various associated components thereof.

Hence in its contemplated embodiment the operation of the invention in general is as follows. The roll of tape 18 to be searched is unwound from left to right for example, while the operator scans the tape through a magnifier 72 (FIG. 5), since in addition to the usual perforations, the tape 18 may contain readable symbols which the operator can visually identify. In such a situation only the clutch 50 is engaged, while the shaft 16 is free wheeling. A deceleration or stoppage in the driving shaft 56 therefore is not accompanied by a similar deceleration or stoppage of the shaft 16, so that the tape 18 forms a slack loop between the reels 14 and 30. This slack loop causes both the right and left hand tension arm assemblies 36 and 48 to rotate outward, each respectively under the action of a pair of biasing springs 74 and 76, so that a microswitch associated with each tension arm assembly is actuated. The microswitches, herein designated as 78 and 80 (FIG. 2) are adapted to energize a pair of associated solenoids 82 and 84 which comprise the power for the left hand braking assembly 34 and the right hand braking assembly 46. Since in the present illustration it is necessary to brake the left hand free wheeling reel shaft 16, power is applied only through the left microswitch 78 to the left solenoid 82 thereby actuating the left hand brake assembly 34 to diminish the speed of the free wheeling shaft 16, as more specifically explained hereinafter by a consideration of the circuitry of the device (FIG. 6).

Application of the brake is maintained until the speed of the shaft 16 has decreased below the speed value of the right reel shaft 32 to thereby diminish the slack loop in the tape. This increases the tension in the tape and enables the tension arm assemblies 36 and 48 to return to their normal position against the force of the springs 74 and 76, thereby causing the microswitches to open and de-energize the solenoids 82.

The tape 18 can be stopped instantly by setting the switch 70 to a designated position whereby as hereinafter explained the motor 58 is braked electrodynamically and simultaneously both magnetic clutches 40 and 50 are energized, thus stopping the tape instantly without breaking the tape.

*Driving mechanism*

Referring in more detail to the driving mechanism 60 (FIG. 2), the motor 58 therein shown is a conventional variable speed reversible direct current motor of a type commonly used in the art, embodying an integral gear reducer 86 to provide variable output speeds in either direction. The motor 58 is mounted onto the outer casing 12 in any approved manner and an output shaft 88 connects to a driving pulley 90.

The function of the driving mechanism 60 is to drive the driving shafts 44 and 56 which in turn are connected to the clutch driving sections 42 and 54 respectively of of the magnetic clutches 40 and 50. Towards that end there is provided a pulley 92 integral with a driving gear 94 which meshes externally in driving relation with the driven gear 62 which is adapted to turn the driving shaft 56. The pulley 64 is integral with the left hand driving shaft 44. The driving pulley 90 and the pulleys 92 and 64 are disposed in coplanar relationship and a timing belt 100 envelopes all three pulleys to thereby simultaneously turn the driving shafts 44 and 56 in opposite directions. The shafts themselves are mounted on ball bearings 102 for smoother operation, and an idler pulley 104 provides belt control by means of well known belt tension control techniques.

*Tension arm assembly operation*

Figures 3, 4:
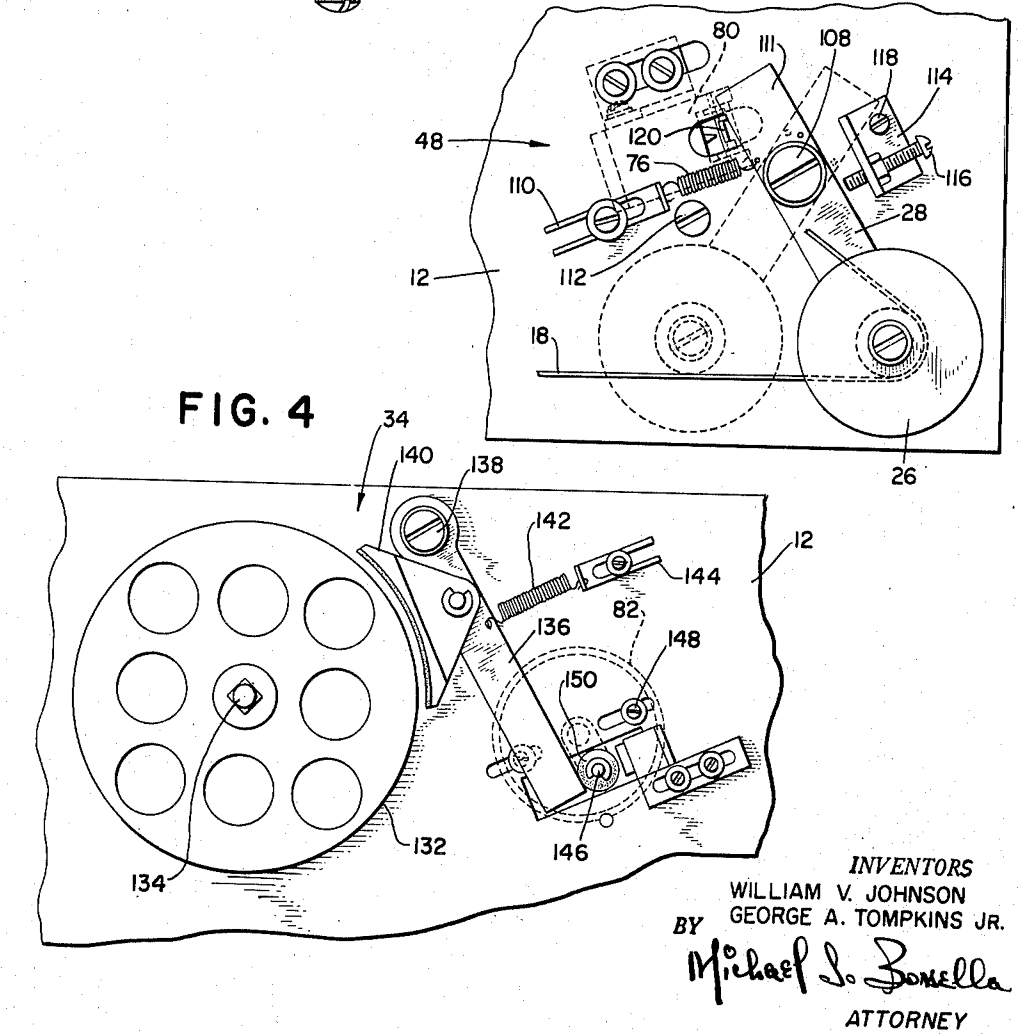
FIG. 3 is a plan view of a tape tension arm mechanism assembly comprising a component of the rewinder.
FIG. 4 is a plan view of a mechanical shaft braking mechanism incorporated in the rewinder.

Referring now to FIG. 3, the right hand tension arm assembly 48 shown therein by way of example, comprises the guide roller 26 mounted on one end of the tape tension arm 28 for receiving and guiding the tape 18. The arm 28 is pivotable generally in a horizontal plane about a pivot 108, and the biasing spring 76 continuously tends to pivot the arm outward against the restraining tension force of the tape 18. The spring 76 is anchored against a fixed bracket 110 and attaches to an end 111 of the arm 28 opposite the roller 26 so that either the tension force of the tape 18 or the resilient force in the spring 76 will cause the arm 28 to swing about its pivot 108. In normal operation the two forces are fairly balanced although a certain latitude in the movement of the arm 28 is provided without effecting the normal transfer of the tape or actuating the mechanical braking mechanisms of the device. To prevent excessive movement of the arm 28, however, a pair of stops 112 and 114 are provided on either side of the arm 28. The stop 112 is fixed, and the stop 114 is adjustable by means of a screw 116 the protrusion of which through a fixed bracket 118 may be regulated and set to the proximity desired with respect to the arm 28.

The microswitch 80 is so positioned in spatial relation to the arm 28 and its associated stops that when the tension in the tape 18 has slackened to the point of forming a so-called slack loop as hereinbefore mentioned, the spring 76 will have resiled sufficiently to pull the arm 28 firmly against a blade 120 on the microswitch 80, thereby tripping the switch. Such a position is illustrated with respect to the right hand tension arm assembly 48 by the solid line position of the arm 28 and roller 106 (FIG. 3).

Tripping the microswitch 80 will immediately energize one of the solenoids 82 and 84 and actuate its associated braking assembly, depending upon which of the shafts 16 or 32 is the free running shaft to be braked. It must be borne in mind that both the right hand and the left hand tension arm assemblies 36 and 46 operate in unison in response to a slack loop, and that consequently both of their associated microswitches will be actuated at once. As it is necessary to brake only the free wheeling shaft, power is applied only to the solenoid associated therewith, thereby actuating that brake assembly only.

The manner in which said selectivity is automatically accomplished will be apparent by the circuitry of the device (FIG. 6) wherein it will be seen, means are provided such that when the left hand clutch 40 is engaged so that the reel 14 is the driving reel, only the right hand solenoid 84 may be energized, and conversely when the right hand clutch 50 is engaged so that the reel 30 becomes the driving reel, then only the left hand solenoid 82 may be energized and the associated brake applied.

*Braking mechanism operation*

Referring now to FIG. 4, wherein the left hand braking mechanism assembly 34 is illustrated by way of example, there is shown a brake drum 132 having an aperture 134 for receiving the reel shaft 16. The brake drum is attached to the shaft in an approved manner not shown here, and therefore rotates in unison with the shaft. A brake arm 136 is pivotal about a fixed pivot screw 138 at one extremity of the arm, and mounts a brake shoe 140 adapted to engage and bear against the drum 132. The brake arm and associated shoe are normally held in their unapplied position by means of a brake arm spring 142 anchored to a fixed bracket 144 and attached to the arm 136.

The left hand solenoid 82 is a conventional rotary type wherein an operating arm 146 is actuated for a distance when the solenoid is energized. The solenoid is fixedly mounted on the casing 12 as by screw 148 in exact spatial relation to the arm 136 so that a bumper 150 on the operating arm 146 bears against the end of the brake arm 136 in the normal non-applied position of the brake.

When the solenoid 82 becomes energized the operating arm 146 and bumper 150 thereof will swing in the direction of the brake arm 136 driving the arm along with it against the tension force of the spring 142 in a pivotal motion about the pivot 138, and forcing the brake shoe 140 to engage and bear against the drum 132. The braking position thus achieved will be maintained until the solenoid becomes de-energized and the bumper arm is returned to its original position. The spring 142 then drags the brake arm back against the bumper 150.

It will be noted that by rapid and intermittent energizing of the solenoid, a brake patting effect may be achieved against the drum 132 sufficient to decelerate the reel shaft 16 without stopping it altogether if such operation is desired.

*System operation*

It will now be perceivable that the herein disclosed automatic tape rewinder is susceptible of operation in either direction at variable speeds; and may also be instantaneously halted by braking the motor 58 electrodynamically and simultaneously energizing the magnetic clutches 40 and 50. Such dynamic braking procedure would most probably be employed when upon scanning the tape, the message sought for is located by the operator of the device.

In addition thereto regardless of the direction in which the tape is being transferred, means are provided for the mechanical braking of the free wheeling reel. For example, if the tape 18 being transferred from left to right, the right hand clutch 50 will be engaged while the left hand clutch 40 will be disengaged. Thus, the reel 30 will be the driving reel and the reel 14 will consequently be the free wheeling reel. In this situation, under a slack loop condition only the left solenoid 82 associated with the left hand braking mechanism 34 will become energized although both the microswitches 78 and 80 have been tripped by their respective tension arm assemblies 36 and 48. In the transfer of the tape from right to left, the opposite counterparts will become active, as more particularly appears with reference to FIGS. 7 and 8.

In FIG. 7 there is shown the five position switch 70 and a face plate 156 indicating the five positions to which an indicator 158 may set the switch. Manipulation of the indicator 158 controls the direction of transfer of the tape and the dynamic braking of the device. There is shown (FIG. 7) two BK (dynamic brake) positions and two RUN positions marked forward and reverse, and a central OFF position.

In the forward RUN position the tape 18 will be transported from the left reel 14 to the right reel 30, and the forward BK position will dynamically brake both reels. The reverse RUN and BK positions of the indicator 158 provide the same features in transporting the tape in the opposite direction from the right reel 30 to the left reel 14. Thus the switch 70 may be off altogether as in the central position, or it may be set to run either forward (from right to left) or in the opposite direction, and a dynamic brake position is provided for each running direction, as at position BK. The relation and operation of the magnetic clutches 40 and 50, and the motor 58, with the direction of transfer of the tape, and the association therewith of the dynamic braking feature, together with a left and a right hand relay RLS and RRS (FIG. 6) whose function will be hereinafter explained, is shown tabularly in FIG. 8, for each of the five possible operating conditions at which the switch 70 may be set.

The manner in which the coordination between the various components for each switch position is automatically achieved will be apparent by a consideration of the circuitry of the device (FIG. 6). Referring thereto, it will be seen that the brake solenoids 82 and 84 are under the control of two relays RLS and RRS, which are energized from a separate source of power by means of conductors 162 and 164, obtained from the field D.C. power supply 187 for the motor 58. The magnetic clutches 40 and 50 are connected in parallel with the relays RLS and RRS respectively and are also energized by leads 162 and 164. Therefore each relay RLS and RRS can only be energized when its connecting magnetic clutch is energized. The D.C. power for the solenoids 82 and 84 however is drawn from a rectifier 165 through conductors 166 and 168, and is supplied to the solenoids through the normally closed contacts 170, 172 and 174, 176 of the relays RLS and RRS, while the A.C. power from a line source L can only reach the rectifier 165 through the normally open contacts 178, 180 of relay RRS and 182, 184 of relay RLS.

The diagram of FIG. 6 illustrates the connected components of the device in the "Off" position of the indicator 158, which corresponds to line 1 of the tabulation of FIG. 8.

Considering now the forward "Run" position of the indicator 158, there is shown (FIG. 6) the control unit for the device consisting generally of the five position switch 70, a transformer, and a rectifier indicated generally by the numerals 186 and 188 respectively. A.C. power is initially supplied to the rectifier 188 from a line source L by means of a pair of conductors 179 and 181. In the forward "Run" position of the device it is desired to engage the right hand magnetic clutch only. With the indicator 158 so set, power for the clutch is then drawn from the field winding 187 of the motor 58 through conductor 162 and conductors 190 and 192 which connect the right clutch 50 in parallel with the coil winding of the relay RRS. Thus the right hand clutch 50 becomes engaged and the relay RRS is tripped. The return current follows a conductor 194 back to the field 187.

Tripping the relay RRS however has caused the normally closed contacts 170, 172 thereof to open, thereby supplying A.C. power to the rectifier 165 via conductor 196, the relay contacts 178, 180 and a conductor 198. It will be noted that in such situation, a circuit is completed for energizing the left solenoid 82 with power from the rectifier 165, which needs only the closing of the left microswitch 78 for completion. Such circuit is traceable through the conductor 168 from the rectifier, to the relay RLS, through the normally closed contacts 174, 176 of the relay to the microswitch 78, from the microswitch to the L.H. solenoid 82 and along the conductor 166, back to the rectifier 165.

The formation of a slack loop at this point, as aforesaid will operate to close both microswitches 78 and 80 thereby closing the said circuit to energize the solenoid 82 and actuate the left hand brake mechanism 34. It is noted that the right hand microswitch 80 also closes under the effect of a slack loop. But its associated solenoid 84 cannot be energized because of a gap in the circuit caused by the now open contacts 170, 172 of the relay RRS. Therefore under such a situation the right hand brake mechanism 46 is precluded from becoming operative. This relationship of the components as described, is illustrated by line 3 of the tabulation of FIG. 8.

The circuit is analogous in the reverse running position of the indicator 158 and may be readily traced in like manner, bearing in mind that the left hand clutch 40 and its associated relay RLS are the components which become energized, while the right hand clutch 50 and relay RRS remain inactive, as illustrated in line 4 of the tabulation of FIG. 8.

To halt operation of the rewinder immediately, the indicator 158 of the switch 70 is set to the brake position BK. The relation of the components will then be as indicated in lines 2 and 5 of the tabulation of FIG. 8. One advantage of dynamic braking is that this feature permits both reels 14 and 30 to be brought to a smooth, swift stop by the motor 58 only. Because of the smoothness of the stop, there is no stress or load thrown onto the tape 18, and therefore no likelihood or danger that the tape will be broken.

The state of the circuitry for dynamic braking is that conductors 162 and 164 simultaneously conduct power from the field 187 to the right hand clutch 50 and left hand clutch 40 thus engaging both clutches and actuating their associated relays. It will be noted that since the clutch driving sections 42 and 54 must always drive in opposite directions, simultaneous engagement of both sections with their respective driven sections 38 and 42 will operate to immediately immobilize both reels. Simultaneously the armature 210 of the motor 58 is short circuited out from the field 187 thereby instantly stopping the motor.

While both relays RRS and RLS are actuated in the dynamic braking process, their associated solenoids cannot become energized because with both clutches engaged the possibility of a slack loop forming, which might otherwise close the microswitches, is precluded. Therefore the mechanical braking assemblies can never be operative during the dynamic braking process.

As disclosed in one of the objects of the invention, the herein described tape rewinder may be operated at relatively high speeds. The scanning of the tape 18 is therefore considerably facilitated, at such high speeds, by the provision of the scanning aid 24 (FIG. 5). The aid 24 consists essentially of the magnifier 72 mounted on a pair of hinge posts 214 by means of a hinge 215. The magnifier 72 extends almost the entire distance between the reels 14 and 30 (FIG. 1), and is positioned so that a considerable segment of the tape 18 may be scanned at all times. Both the hinge 215 and the magnifier 72 may be pivoted upward about a hinge ring 216 attached to the hinge posts, to the position indicated by the broken line (FIG. 5). This facilitates threading the tape 18 between the reels in commencing the searching operation.

To provide for compact winding of the reels during operation, a tape snubber 218 is located in the tape path adjacent the magnifier 72 (FIGS. 1 and 2). The snubber 218 creates just sufficient frictional drag on the tape 18, regardless of the direction in which the tape is being transported, so that an orderly compact winding is insured. Further snubbing means for the device are provided in the form of a pair of shaft snubbers 220 (FIG. 2). These provide sufficient frictional drag on each upper reel shaft 16 and 32 that when either reel becomes free running, this drag is great enough to cause the tension developed in the tape 18 to cause the tension arms 22 and 28 to overcome the springs 74 and 76 respectively so that the arms are normally rotated inward to keep the microswitches 78 and 80 normally open.

It will thus be seen that there is provided a novel automatic tape rewinder in which the several objects of this invention are achieved and which is well adapted to meet the conditions of practical use.

Although only one embodiment and one application of the invention has been illustrated and described, it will readily be apparent to those skilled in the art that changes in form and modifications may be made without departing from the spirit and scope of the invention.

We claim:

1. In a tape rewinder having a pair of tape reels each mounted on a rotatable shaft adapted to be interchangeably driven and free wheeling, including a tape transferable between the reels in either direction, the improvement comprising, a driving shaft for each rotatable shaft, a motor driving both driving shafts, clutching means on each of said shafts selectively operable to engage the associated rotatable shaft, tension arm assembly associated with each reel for guiding the tape and maintaining tension therein and braking mechanism associated with each rotatable shaft, a solenoid for each braking mechanism, said tension arm assemblies being movable against the tension in the tape to energize one of said solenoids to brake the free wheeling shaft by its associated braking mechanism, and control means for internally braking said drive motor and simultaneously causing the clutching means to engage both rotatable shafts to dynamically brake the tape rewinder.

2. A tape rewinder for locating a message on a roll of tape comprising, a pair of tape reels including a tape transferable therebetween, one reel being a driven reel and the other reel being a free wheeling reel, a rotatable shaft adapted to be driven supporting each reel, a drive shaft associated with each rotatable shaft, a clutch connecting each drive shaft to its associated rotatable shaft, a motor for actuating the drive shafts, a control unit for selectively engaging either drive shaft in clutching connection with its associated rotatable shaft, a tension mechanism including a pivotal tension arm for each reel, a roller mounted on each arm for guiding the tape, a switch associated with said arm, a spring biasing said arm against the tension in the tape toward said switch, a braking mechanism associated with each rotatable shaft including a brake drum mounted on the shaft, a brake arm and shoe adapted to engage said drum, a solenoid for actuating said brake arm, said solenoid being energized upon the spring overcoming the tension in the tape to cause the tension arms to actuate said switch and the solenoid associated with the free wheeling reel, and means in said control unit for simultaneously engaging both drive shafts with their respective rotatable shafts and internally braking said motor to dynamically brake the tape rewinder.

3. In a control system for an automatic tape rewinder the combination comprising, a reversible motor, a power source for said motor, a left hand clutch and a right hand clutch, an associated relay for each clutch connected in parallel therewith, a switch for selectively energizing either of said clutches from the field of said motor, a left hand solenoid and a right hand solenoid either being energized through the relays by said power source, a pair of microswitches simultaneously operable to connect either of the solenoids with the power source and relays, said switches being connected upon the closing thereof to energize the left hand solenoid when the right hand clutch is engaged and the right hand solenoid when the left hand clutch is engaged.

4. In a control system for an automatic tape rewinder having a right hand and left hand reel including a tape transferable therebetween and a rotatable shaft supporting each reel, and the left hand reel is free wheeling when the tape is transferred from the left hand reel to the right hand reel, and the right hand reel is free wheeling when the tape is transferred from the right hand reel to the left hand reel, the combination comprising, a reversible motor for driving the reels, a power source for said motor, a left hand clutch and a right hand clutch for connecting the respective shafts to the motor, a relay associated with each clutch and connected in parallel therewith, a switch for selectively energizing said clutches from the field of the motor, a braking assembly associated with each shaft, a right hand solenoid and a left hand solenoid adapted to be energized by said power source through the relays for actuating either of the braking assemblies, a pair of microswitches simultaneously actuated in response to the tension in said tape to connect either of the solenoids with the relays, said switches being connected to the power source and field to energize the left hand clutch and associated relay to thereby energize the right hand solenoid when the right hand reel is free wheeling, and the right hand clutch and associated relay to thereby energize the left hand solenoid when the left hand reel is free wheeling upon the closing of the microswitches.

5. A control system in accordance with claim 4 including a rectifier connected to the power source, a pair of normally open contacts and a pair of normally closed contacts on said relays, the power for the solenoids being supplied from said source through the normally closed contacts and the power to the rectifier being supported through the normally open contacts of said relays.

6. A control system in accordance with claim 3 wherein the left hand clutch and associated relay are operably connected to become energized to cause the relay to break contact between the power source and the left hand solenoid, and the right hand clutch and associated relay are operably connected to become energized to cause said relay to break contact between the power source and the right hand solenoid.

7. In tape rewinding apparatus for scanning a tape to locate a message thereon, the combination comprising an enclosed casing mounting a pair of tape reels including a tape transferable in either direction therebetween, a pair of rotatable shafts supporting the reels, either shaft being adapted to be driven and the remaining shaft being free wheeling, a tape snubber to provide compact winding of the reels, and snubber for each shaft to develop tension in the tape, a variable speed reversible motor connected to a driving pulley, a pair of driven pulleys connected in synchronously driven relation to the driving pulley, a driving shaft rotated by each driven pulley in opposite directions, a pair of magnetic clutches adapted to connect each driving shaft with a rotatable shaft, a control unit including a multi-position switch adapted to selectively energize said clutches to select the direction of transfer of the tape, a speed regulator for said motor, a brake assembly associated with each rotatable shaft and an actuating solenoid for each brake assembly, a tension mechanism including a pivotal tension arm for each reel, a microswitch associated with each arm in selected spatial relation thereto adapted to be closed by the movement of the arm upon slackening of tension in the tape, the actuating solenoids being energizable upon the closing of said microswitches, a relay associated with each magnetic clutch controlling the solenoids so as to energize the brake actuating solenoid associated with the free wheeling shaft and actuate the associated brake assembly, and means operable by the multi-position switch to simultaneously energize both magnetic clutches and halt the motor to immediately stop the tape travel upon locating said message.

References Cited by the Examiner

UNITED STATES PATENTS

| | | | |
|---|---|---|---|
| Re. 22,970 | 2/1948 | Begun | 242—75.4 X |
| 1,286,331 | 12/1918 | James | 242—75.44 |
| 1,964,874 | 7/1934 | Fankboner | 242—75.44 |
| 2,221,543 | 11/1940 | Johannessen | 242—54 |
| 2,528,061 | 10/1950 | Knapp | 242—54.1 |
| 2,637,129 | 5/1953 | Congdon | 40—31 |
| 2,646,229 | 7/1953 | Clough | 242—67.4 |
| 2,658,952 | 11/1953 | Harsant et al. | 242—55.12 X |
| 2,725,200 | 11/1955 | Ward | 242—55.14 |
| 2,778,580 | 1/1957 | Howell | 242—67.4 |
| 2,873,318 | 2/1959 | Moore | 242—55.12 X |
| 2,923,488 | 2/1960 | Gratian et al. | 242—55.12 |
| 2,948,488 | 8/1960 | Schoebel et al. | 242—75.43 |
| 3,041,000 | 6/1962 | Springer | 242—55.12 |

MERVIN STEIN, *Primary Examiner.*

EDWARD V. BENHAM, RUSSELL C. MADER, *Examiners.*